United States Patent
Fleischmann et al.

(10) Patent No.: US 11,321,665 B2
(45) Date of Patent: May 3, 2022

(54) SYSTEM AND METHOD OF AUTOMATED TRACKING OF CONSUMABLE PRODUCTS

(71) Applicant: WEIGHTRX INC., Toronto (CA)

(72) Inventors: Robert Fleischmann, Toronto (CA); Steven Van Fleet, Lagrangeville, NY (US)

(73) Assignee: Weightrx Inc., Toronto (CA)

( * ) Notice: Subject to any disclaimer, the term of this patent is extended or adjusted under 35 U.S.C. 154(b) by 0 days.

(21) Appl. No.: 16/641,070

(22) PCT Filed: Aug. 22, 2018

(86) PCT No.: PCT/US2018/047567
§ 371 (c)(1),
(2) Date: Feb. 21, 2020

(87) PCT Pub. No.: WO2019/046070
PCT Pub. Date: Mar. 7, 2019

(65) Prior Publication Data
US 2020/0387856 A1    Dec. 10, 2020

Related U.S. Application Data

(60) Provisional application No. 62/551,572, filed on Aug. 29, 2017.

(51) Int. Cl.
*G06Q 10/08* (2012.01)
*G06Q 30/06* (2012.01)

(52) U.S. Cl.
CPC ....... *G06Q 10/087* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 9,449,296 B2 * | 9/2016 | MacDonald | G16H 20/10 |
| 10,578,657 B2 * | 3/2020 | Decamp | G06F 1/266 |

(Continued)

FOREIGN PATENT DOCUMENTS

| | | |
|---|---|---|
| KR | 20060048977 A | 5/2006 |
| WO | WO-2006116665 A1 | 11/2006 |
| WO | WO-2014160491 A2 | 10/2014 |

OTHER PUBLICATIONS

International Search Report issued in International patent application No. PCT/US2018/047567 dated Oct. 23, 2018.

(Continued)

*Primary Examiner* — Fateh M Obaid
(74) *Attorney, Agent, or Firm* — Cooley LLP

(57) ABSTRACT

This invention relates to the automatic identification and measurement of the consumption of an item or items and reporting of consumption of primarily, but not limited to, foodstuffs and provisions, that are typically stored in refrigerators, pantries, cupboards, apparatus and display shelves, store cases, shopping carts and baskets and the like. The invention therefore allows humans to accurately and automatically track their nutritional input, inventory transferal and in-store purchases in real-time. The invention relates to low-cost, printable electronics with integrated micro-electromechanical (MEMS) and/or Nanoelectromechanical systems (NEMS), wireless inductive power and wireless communication, and targets a low-cost solution applicable to consumer applications.

14 Claims, 16 Drawing Sheets

(56) References Cited

U.S. PATENT DOCUMENTS

| | | | |
|---|---|---|---|
| 2007/0069867 A1 | 3/2007 | Fleisch et al. | |
| 2013/0035950 A1* | 2/2013 | MacDonald | G06K 7/10415 |
| | | | 705/2 |
| 2013/0218511 A1* | 8/2013 | Mager | G16H 20/60 |
| | | | 702/129 |
| 2014/0006131 A1* | 1/2014 | Causey | G06Q 10/0875 |
| | | | 705/14.24 |
| 2014/0243279 A1* | 8/2014 | Borody | A61K 31/438 |
| | | | 514/29 |
| 2014/0252091 A1* | 9/2014 | Morse | G06Q 10/087 |
| | | | 235/385 |
| 2016/0140526 A1* | 5/2016 | Cummins | G06Q 20/308 |
| | | | 705/28 |
| 2017/0243279 A1 | 8/2017 | Thompson et al. | |
| 2019/0266554 A1* | 8/2019 | Lin | G06Q 30/0202 |
| 2020/0387856 A1* | 12/2020 | Fleischmann | G06Q 10/087 |

OTHER PUBLICATIONS

Extended European Search Report dated Apr. 29, 2021, for European Patent Application No. 18852002.7, 12 pages.

\* cited by examiner

Block Diagram WeighTrx™ Food Preparation Application

NEMS/MEMS Printable Sensors on Transparent Shelf Substrate
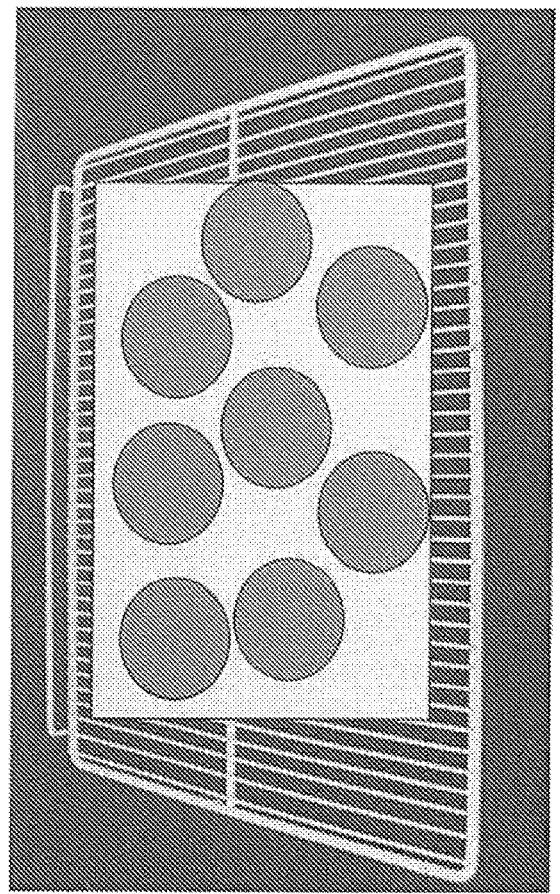
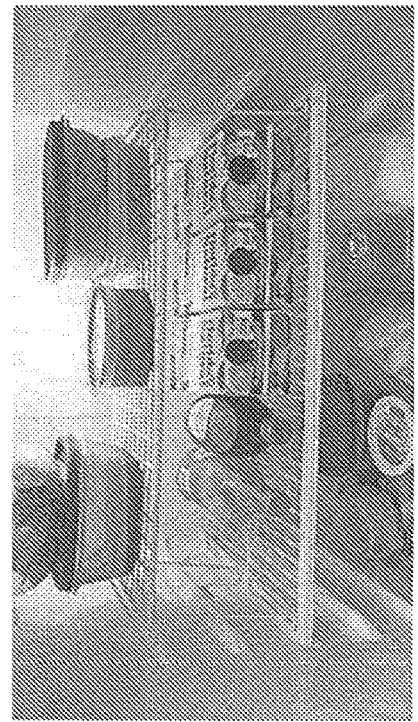
- Printable array of sensors capable of weighing accurately items placed on all form facts of surfaces
- Sensor substrate is transparent allowing for other sensors to identify via patterns, bar code, RFID tag et al the specific item placed on shelf
Figure 8

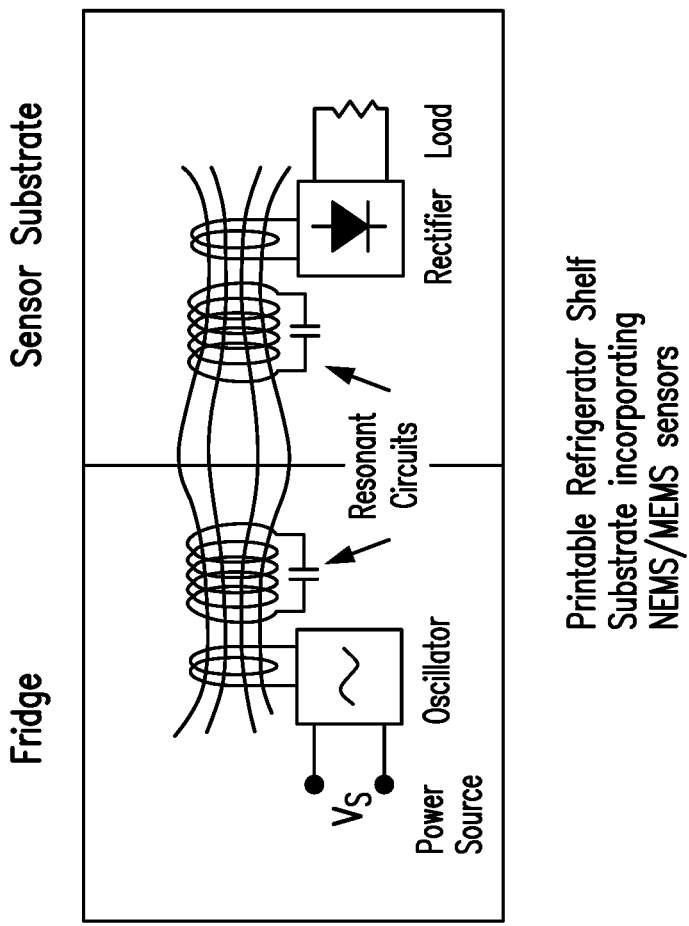
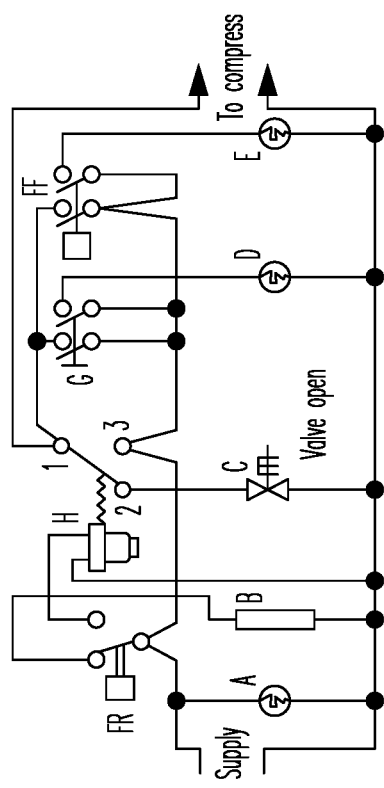
Figure 9

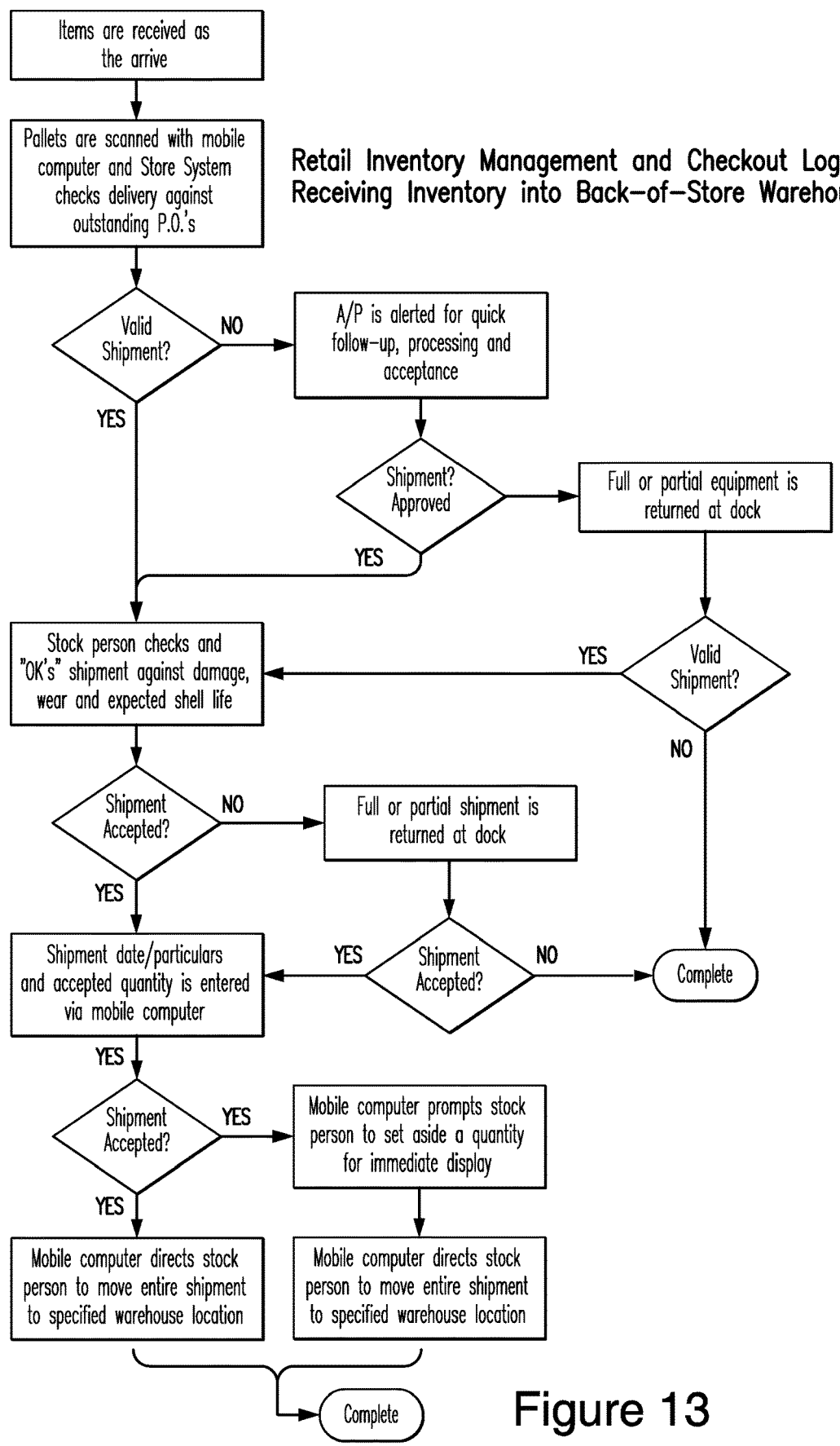

SYSTEM AND METHOD OF AUTOMATED TRACKING OF CONSUMABLE PRODUCTS

CROSS REFERENCE TO RELATED APPLICATIONS

This application is a U.S. National Stage application of PCT International Patent Application Number PCT/US2018/047567, which was filed on Aug. 22, 2018, which claims priority to U.S. Provisional Patent Application No. 62/551,572, which was filed on Aug. 29, 2017, the disclosures of each of which is incorporated herein by reference in its entirety.

FIELD OF NEW INVENTION

This invention relates to the automatic identification, measurement, processing, tracking and reporting of the consumption, location and/or purchasing of primarily, but not limited to, foodstuffs, medication and provisions, herein "consumables" or "items". This invention therefore allows for the identification, measurement, processing, tracking and reporting of consumables movement and/or usage as they are transported from one location to another for consumption and/or consumed directly from said location. The invention relates to an integrated solution of low-cost consumer electronics and methods necessary to detect in real-time the identification, measurement, processing, tracking, reporting and consumption of items. The application generally relates to a real-time information system for dietary or medicinal consumption or retail or wholesale inventory tracking, such as a software application for a mobile computing device, store display or smart phone for identification, measurement, processing, tracking and reporting of consumption metrics and nutritional or medicinal information of consumables for a user or users; or, the identification, measurement, processing, tracking and reporting of consumption metrics of items moved between store display shelves and the like, and shopping carts or baskets and the like, while a user is shopping, recording the pending purchases made or reversed and reporting back on a mobile computing device, store display or smart phone such information, primarily, but not limited to, their running total, nutritional and medicinal content, carrying weight and unpurchased store items of relevance and/or on sale and the items' relative location in the store.

BACKGROUND OF THE INVENTION

Obesity is now recognized as a national epidemic. An estimated 64% of the US population is classified as overweight or obese. Environmental factors, such as increased food portions, western diet based on omega-6 grains and saturated fats, and sedentary lifestyles, have contributed to this epidemic. The epidemic affects children, with 15% of children in the United States aged one to 19 years overweight or obese.

Calorie underestimation is often alleged to contribute to obesity. By developing a psychophysical model of meal size estimation, it has been shown that the association between body mass and calorie underestimation found in health science research is a spurious consequence of the tendency of high-body-mass people to choose—and thus estimate-larger meals. In multiple studies involving consumers and dieticians, it was found that the calorie estimations of high- and low-body-mass people follow the same compressive power function; that is, they exhibit the same diminishing sensitivity to meal size changes as the size of the meal increases. That underestimation of the size of bigger meals may be because the volume and mass of the meal increases as the cube of its linear dimension. It was found that using a piecemeal decomposition improves calorie estimation and leads people to choose smaller, but equally satisfying, fast-food meals. The findings that biases in calorie estimation are caused by meal size and not body size have important implications for allegations against the food industry and for the clinical treatment of obesity.

Other studies examine the role of the highest levels of caloric knowledge, obesity consequences knowledge, and motivation to search for nutrition information in the processing of relative nutrient content claims in advertisements, such as "half the calories" or "half the fat," for products relatively high in total calorie levels. After controlling for the impact of demographics, dietary habits, body mass index, relative ad claims and disclosures, perceived weight gain risk, and other variables, curvilinear (quadratic) effects were found for caloric knowledge, obesity consequences knowledge, and motivation to search for nutrition information on intent to buy an advertised, high-calorie snack bar. This suggests a strengthening of the negative relationship for intent for consumers at the highest levels of caloric knowledge, obesity consequences knowledge, and motivation (i.e. the "nutrition elite"). There are many public policy implications, including whether achieving such exceedingly high levels of nutrition knowledge and motivation is realistic for the general public in light of other policy alternatives, such as market-based solutions (e.g., reducing serving sizes, standardized front-of-package icons).

The fundamental limitation with most nutritional tracking applications and/or patented systems is that they require users to routinely manually enter their food consumption and generally modify their normal routines. Human nature being as it is, most people begin such an effort with bravado but eventually fail to consistently interact with the nutritional tracking application.

Software applications for tracking nutritional information, which may be used on a smart phone for example, typically expect product packaging information for a food product to be read and converted to an identifier for the food product. A comparison of the food product identification against a food product database may be used to retrieve information for the food product from the database. At least part of the information for the food product is added to a user profile. The nutritional elements of the user profile are then analyzed based on the addition of said food product information. The user profile is then updated with results of the analysis for tracking the user's nutritional information. A user can then monitor food intake (such as fat, calories, sugar, food types), at the time of purchasing or consumption, which may be compared to desired targets, goals, or limits.

There are many software applications currently available for smart phones, for example, which help make the user's life more convenient. More and more, people are becoming aware of the health benefits and ability to extend their life by eating healthily and/or consuming fewer calories. For some people, it is critical to track and monitor the number of calories and food types eaten to maintain or lose weight.

There are diet systems that assign points to different food products, but this limits the user to a set of foods that are pre-coded or predetermined by the diet system. There is a need for a nutritional information system that is more flexible and expansive. There is a need for the process of capturing nutritional value information to be automated.

Most food products include some amount of nutritional information on the product label. Also, many restaurants make this nutritional information available to customers regarding the food served on their menu. However, most people do not keep track of their calorie intake nor tally their consumption of certain food types and parts (e.g., fat, cholesterol, sugar) because it is not convenient or easy to do so. There is a need for a user-friendly software system to help a user track this information.

The typical process for populating calorie counting software applications is to manually enter estimated consumption of foodstuffs.

Normal human behavior at the start of anew epoch of eating healthy, or attempting to lose weight, etc., is to immerse oneself in the practice of accurately weighing or otherwise measuring food consumption. After some time, that discipline typically decreases and the value of the calorie counting application diminishes.

There are several inventions describing methodologies for improving the accuracy of the measuring of food consumption. These techniques include attaching RFID tags to foodstuff and adding RFID readers near the food storage or food preparation areas, cameras, barcodes and associated barcode readers, etc. These are not cost-effective solutions for the average consumer to purchase.

These several inventions described above are not simple to integrate into a typical residential or business food preparation and storage environment. This will be an impediment to wide-scale usage as a standard for measuring real-time nutritional consumption.

These several inventions described above require the user to change his/her routine as to preparing consuming foodstuffs, accessing foodstuff storage and the like.

By using low-cost electronics, printable substrates, wireless inductive power or kinetic, solar or ambient light power and wireless communication, such as Bluetooth, NFC, Wi-Fi, and the like and a unique combination of MEMS/NEMS sensors, the automatic identification, measurement and reporting of movement or physical change in consumables is possible, in a manner that does not require the end user to modify their present routine in how they interact with said inventory storage, food consumption or method of shopping.

Several types and quantities of foodstuffs and provisions may be stored in generic opaque packaging and containers that make identification difficult. Current inventions requiring a bar code and/or RFID tag or any other type of identifying mark is expensive and would require continuous reprogramming because these types of containers are constantly repurposed. The proposed invention solves this issue and also eliminates the tagging and reprogramming, typically required.

The proposed invention is specifically designed to allow via industry standard software interfaces, application developers to create a plethora of new applications focused on improving the efficiency and health value of nutritional tracking software and/or the inventory movement and consumption from a warehouse or store, and/or tracking the pending purchases of a shopper.

SUMMARY OF INVENTION

In embodiments, the invention comprises integrated, low-cost, sensing modalities including, but not limited to, printed electronics, MEMS/NEMS sensor modalities, wireless power and communication, software interfaces to current and future domain-specific applications, verbal interaction with technology platforms, and methods focusing this apparatus to automatically identify, measure, track and report on consumption of foodstuffs, provisions and the like, and/or the inventory movement and consumption from a warehouse or store, and/or tracking the pending purchases of a shopper.

BRIEF DESCRIPTION OF THE FIGURES

FIG. 8 illustrates the general configuration and concept of a cost effective thin shelf liner that will include embedded sensor technology used to track consumption of a food item and/or removal or replacement of an item from warehouse inventory or a store shelf.

FIG. 9 illustrates the general configuration and concept of the ability to inductively power the printable electronics using the powered food storage units' present power supply.

FIG. 13 illustrates a diagram indicating the logic of receiving and tracking inventory into back-of-store warehouse.

DETAILED DESCRIPTION OF THE INVENTION

Figure 1:
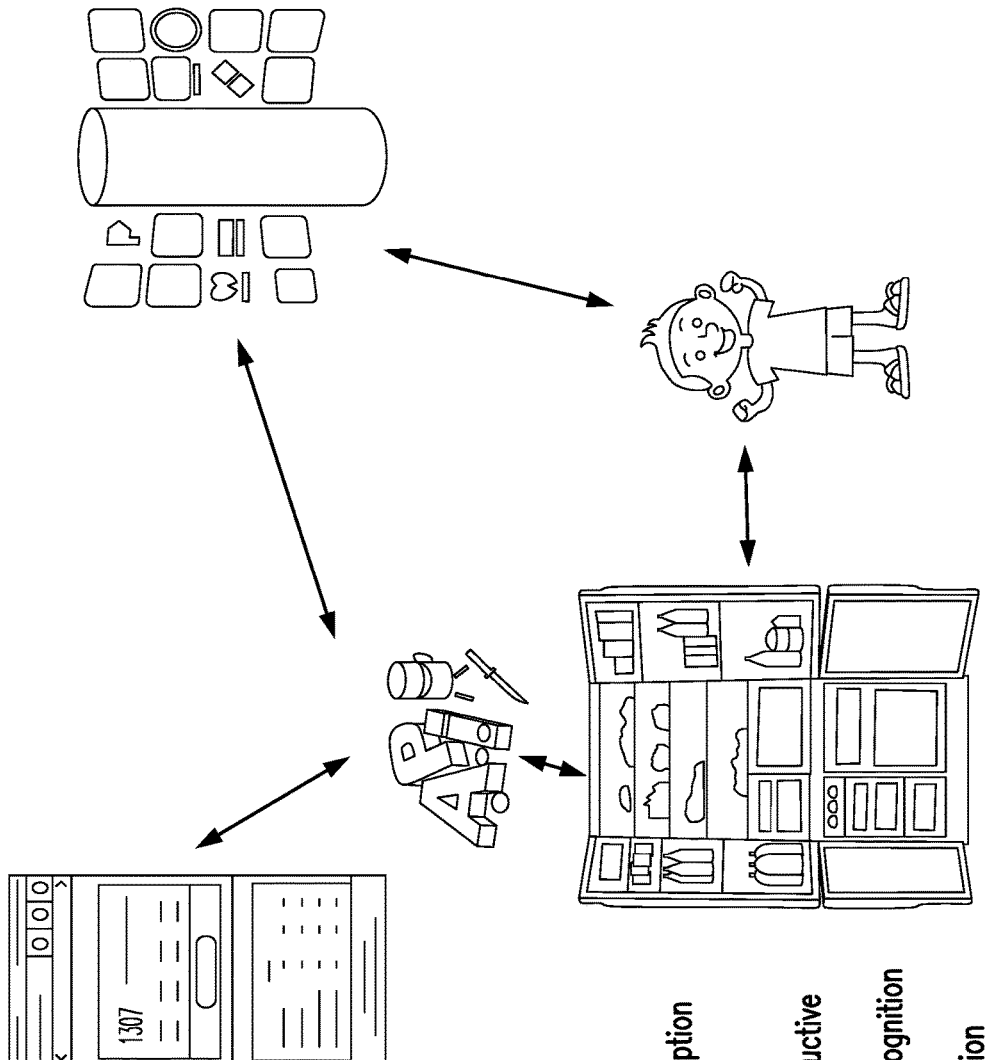
FIG. 1 illustrates an overview of the invention as it relates to applications involving food storage and removal from a refrigerator or other powered storage appliances.
Figure 2:
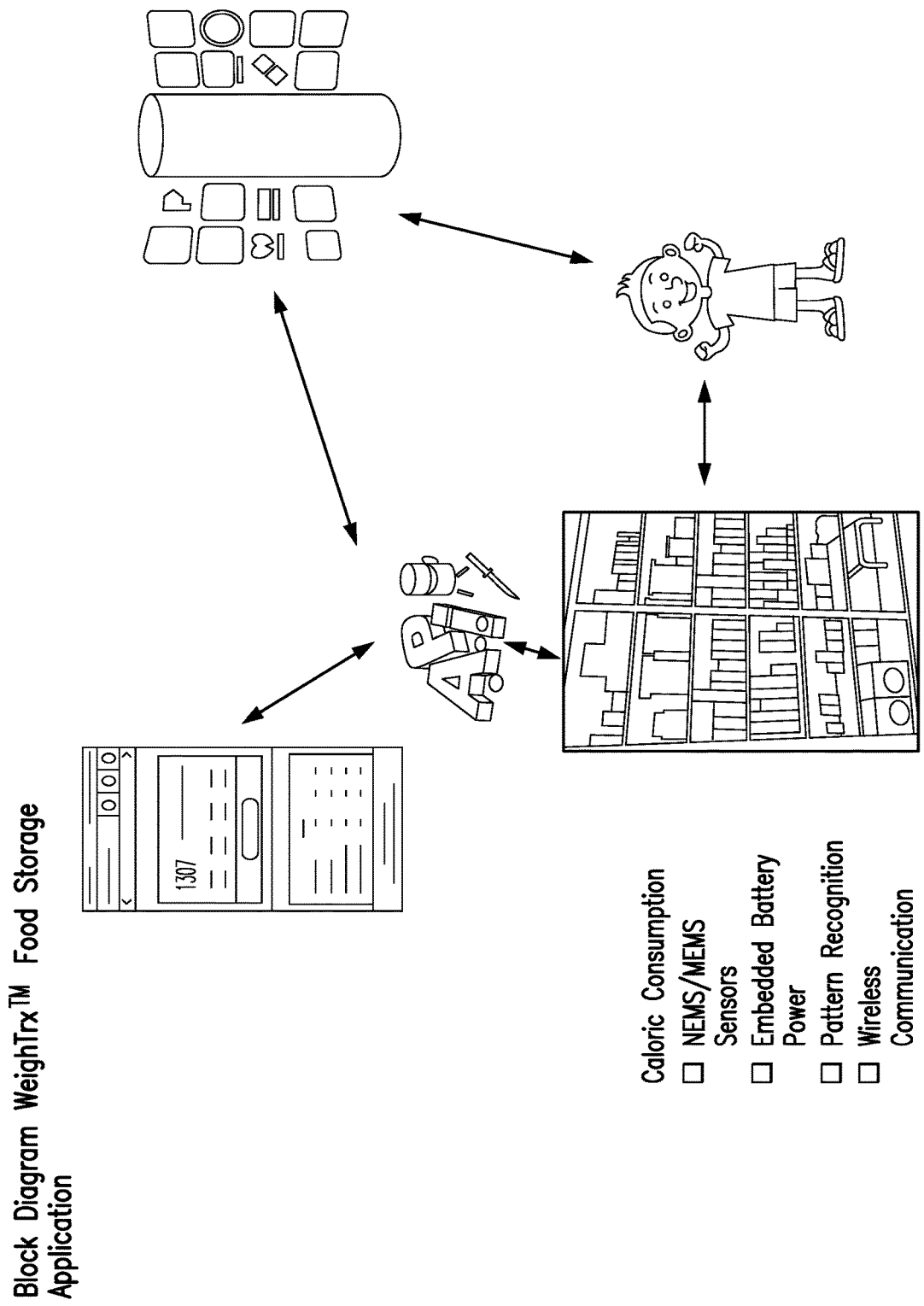
FIG. 2 illustrates an overview of the invention as it relates to applications involving food storage and removal from general food storage other than powered storage appliances.
Figure 3:
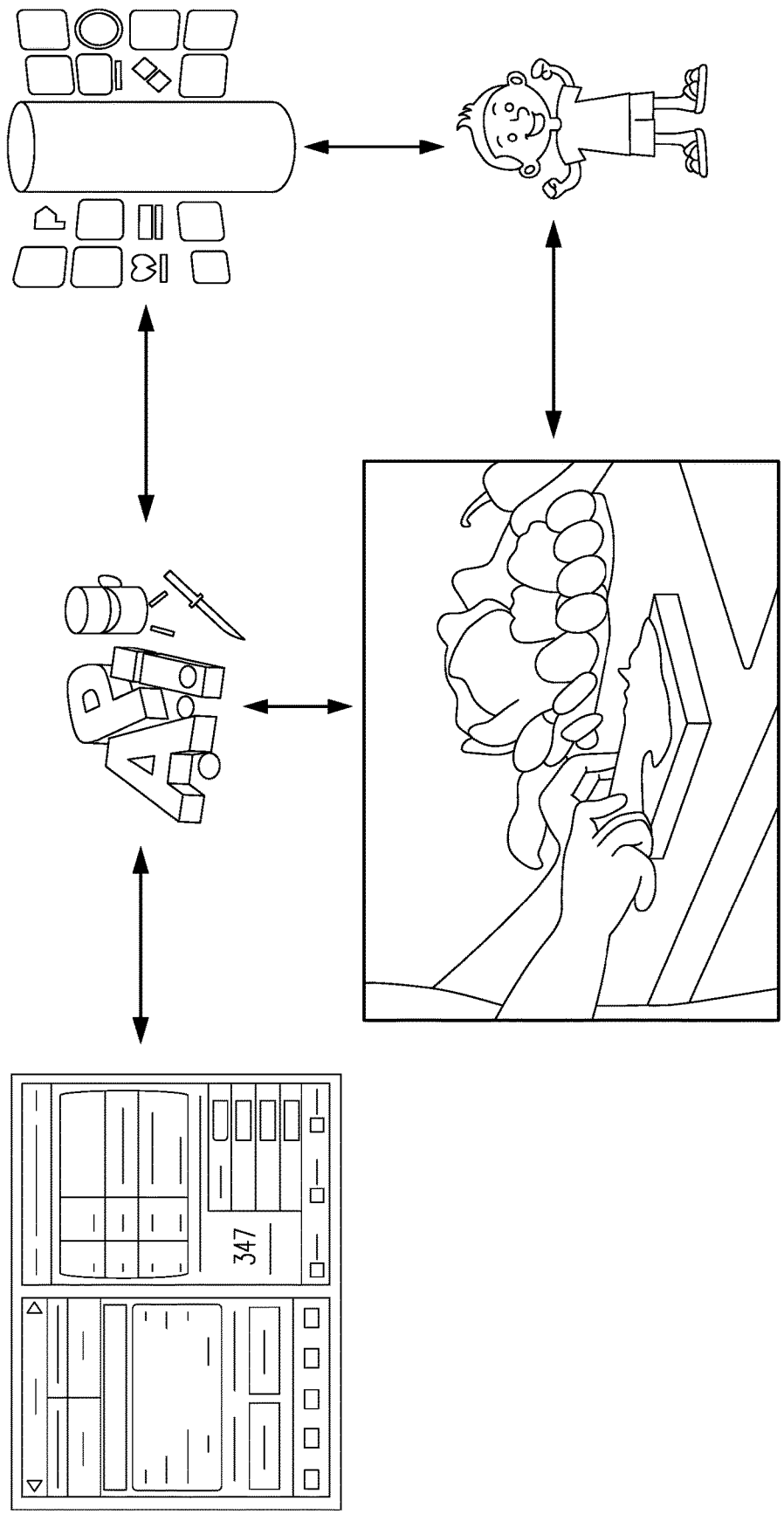
FIG. 3 illustrates an overview of the invention as it relates to applications involving food preparation prior to actual consumption.
Figure 4:
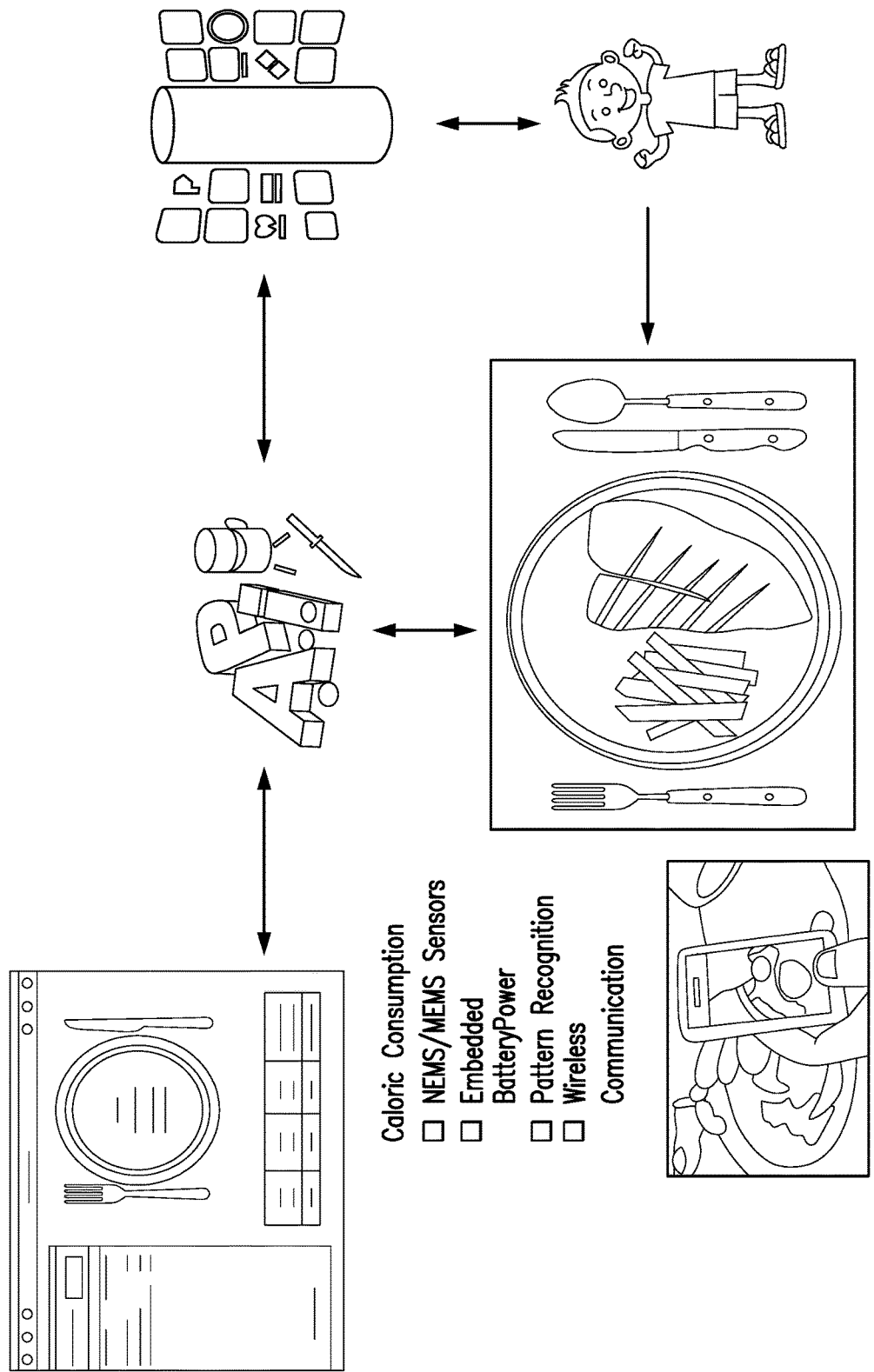
FIG. 4 illustrates an overview of the invention as it relates to applications involving food consumption.
Figure 5:
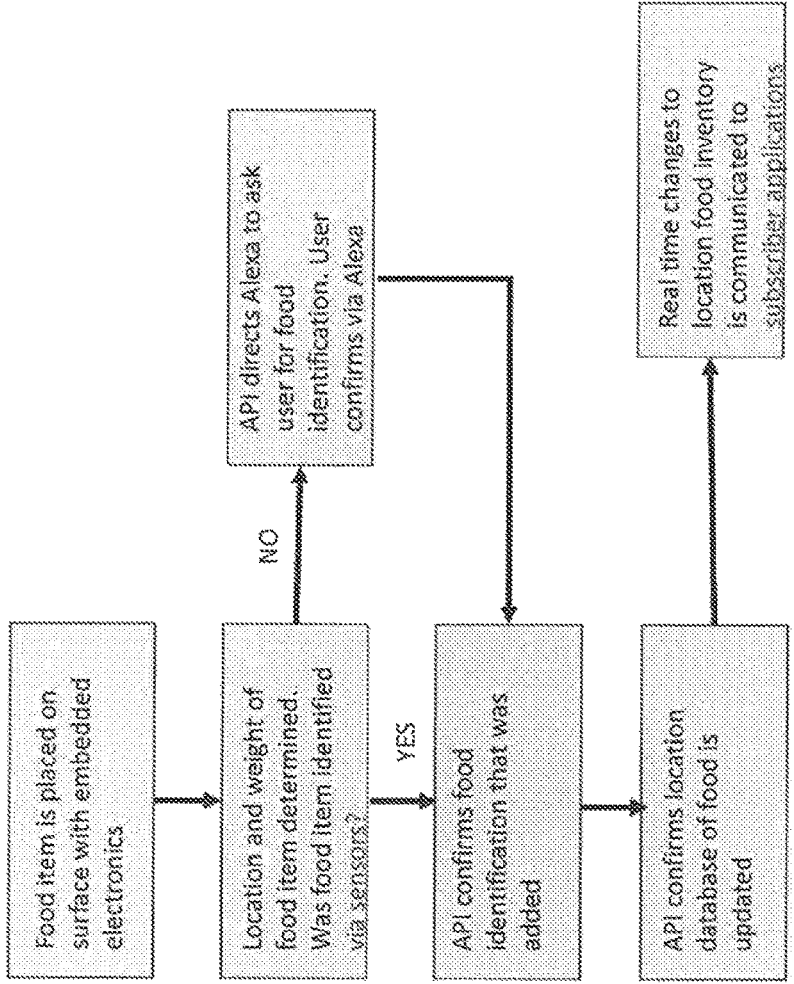
FIG. 5 illustrates a diagram indicating the logic of capturing the addition of a food item to a location that is monitored with the embedded electronics.
Figure 6:
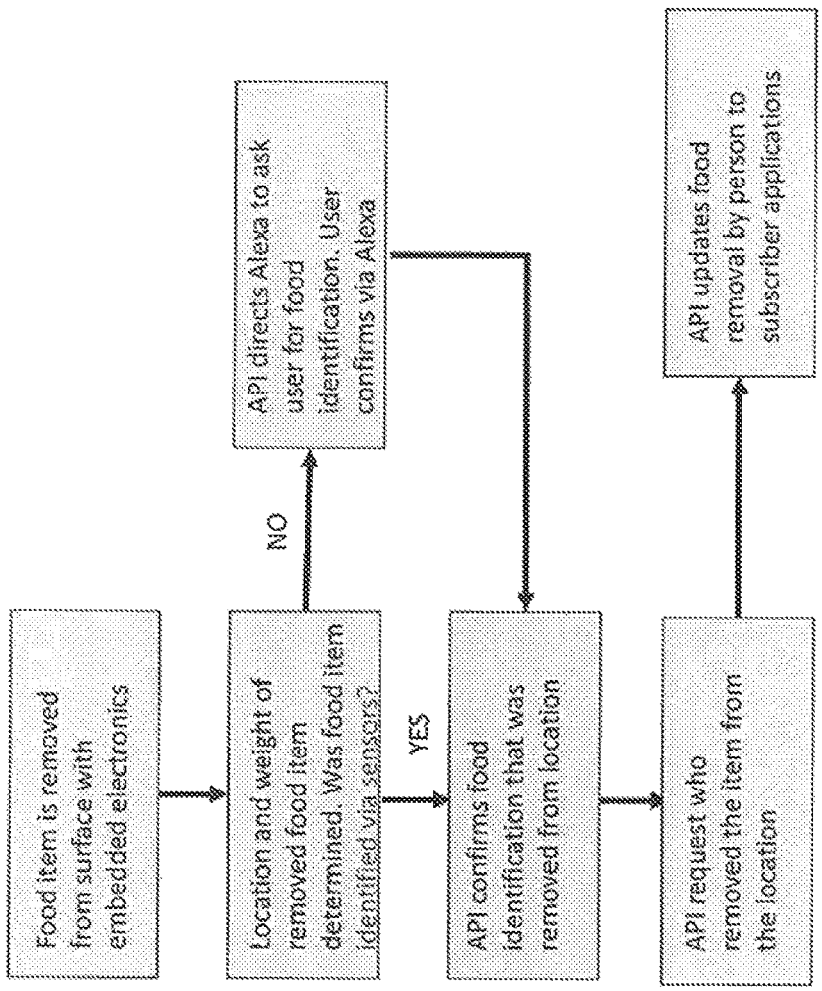
FIG. 6 illustrates a diagram indicating the logic of capturing the removal of a food item to a location that is monitored with the embedded electronics.
Figure 7:
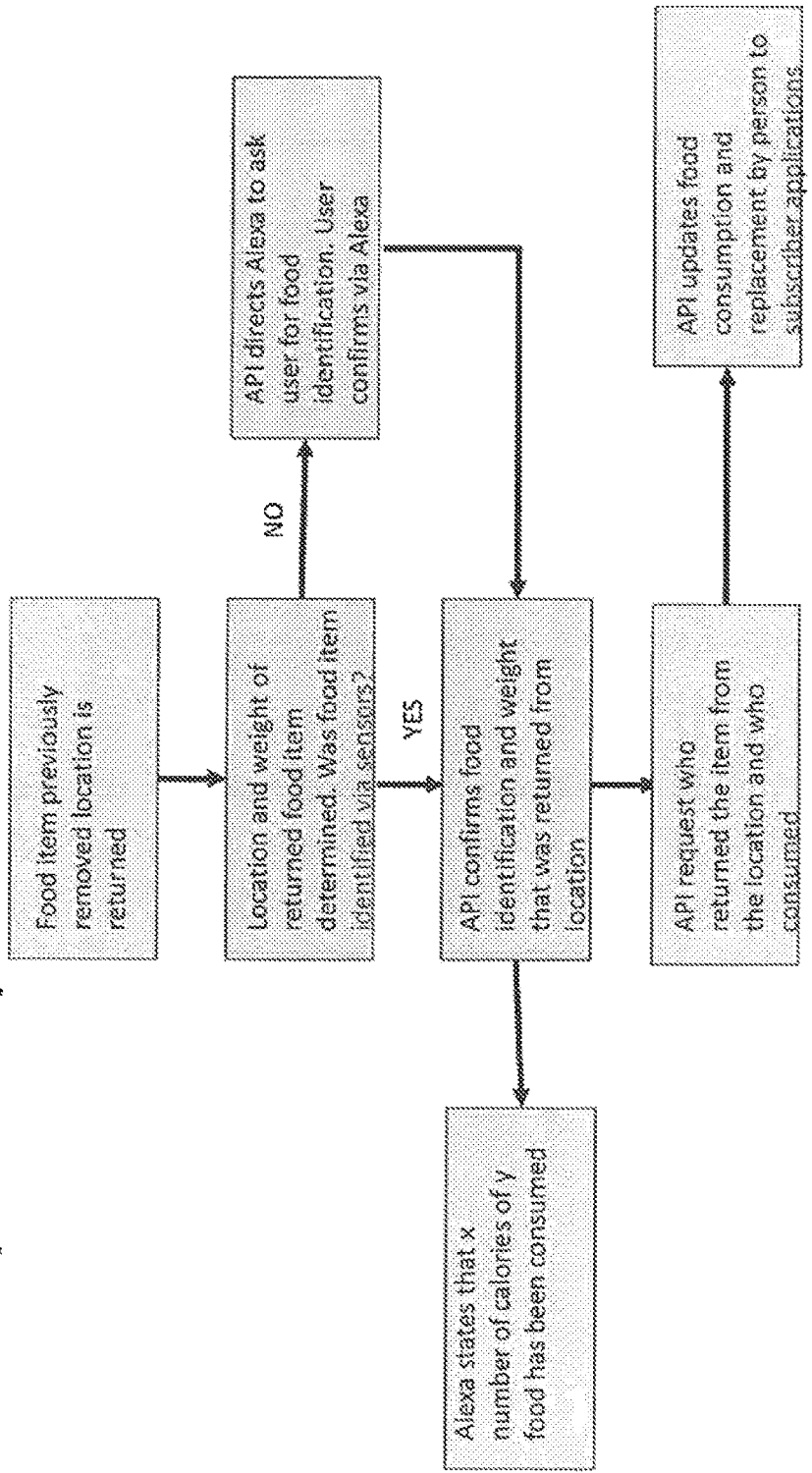
FIG. 7 illustrates a diagram indicating the logic of capturing the consumption by individual of a food item to a location that is monitored with the embedded electronics.
Figure 10:
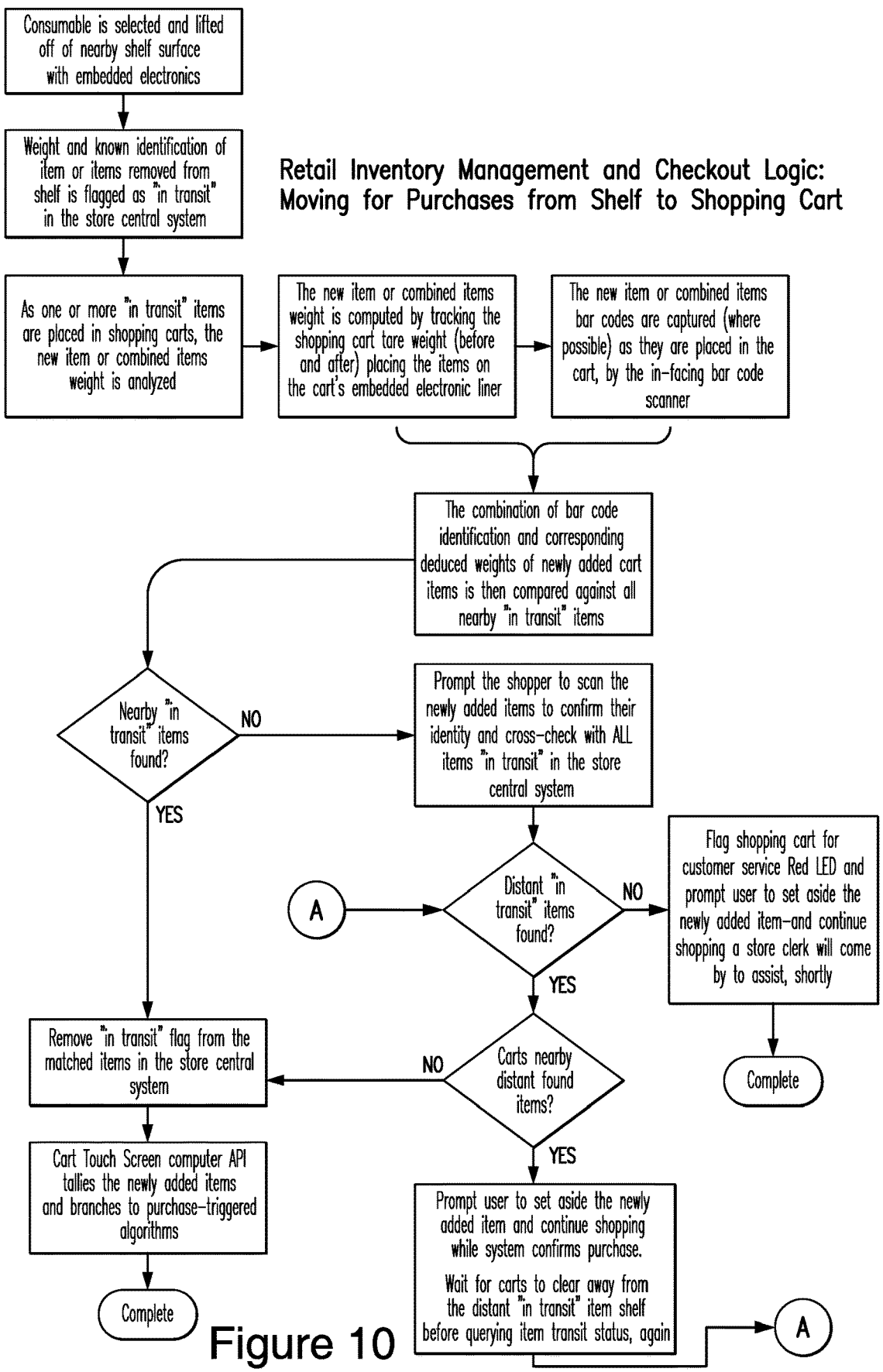
FIG. 10 illustrates a diagram indicating the logic of moving pending purchases from shelf to shopping cart.
Figure 11:
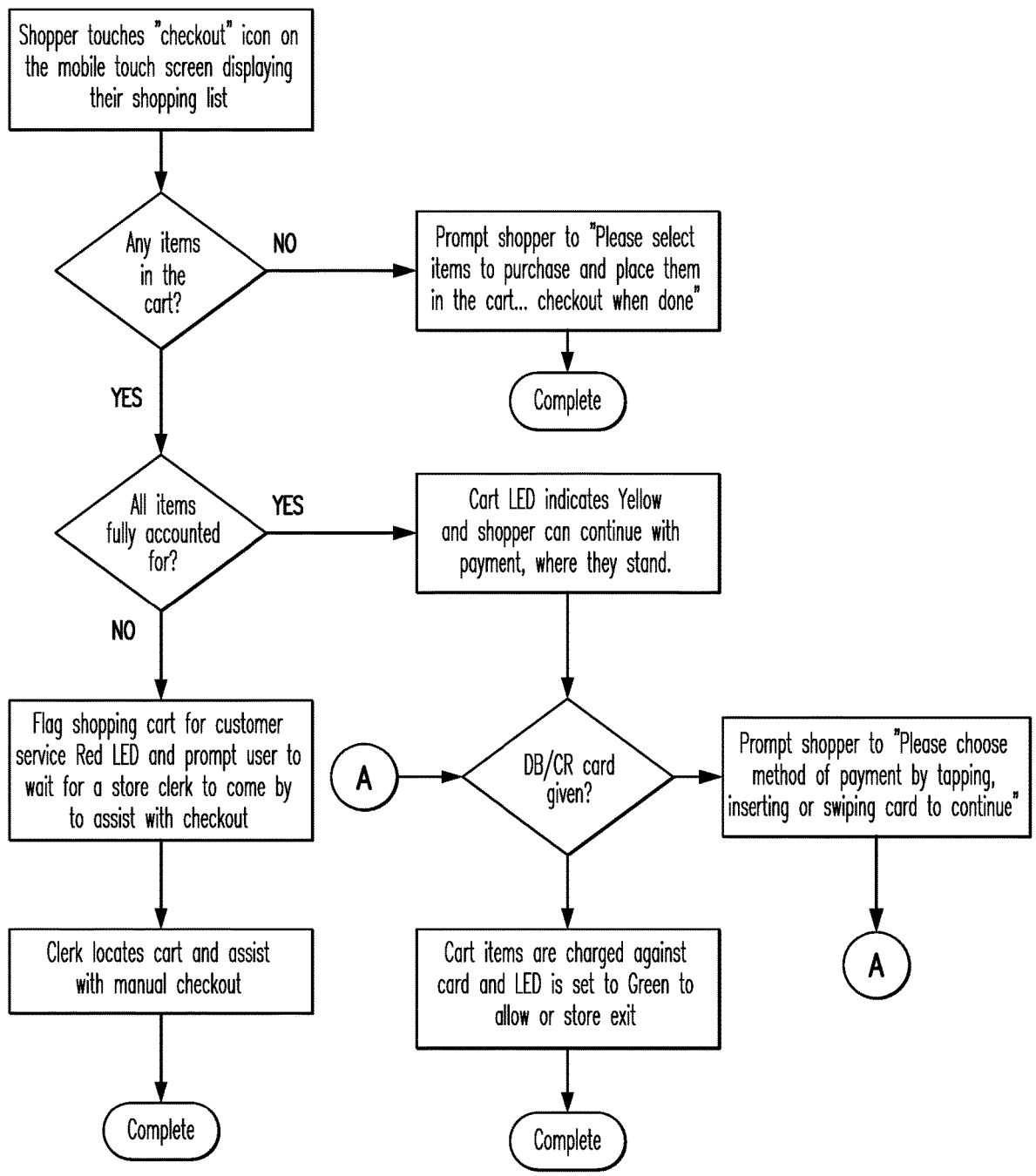
FIG. 11 illustrates a diagram indicating the logic of paying for pending purchases gathered in a shopping cart.
Figure 12:
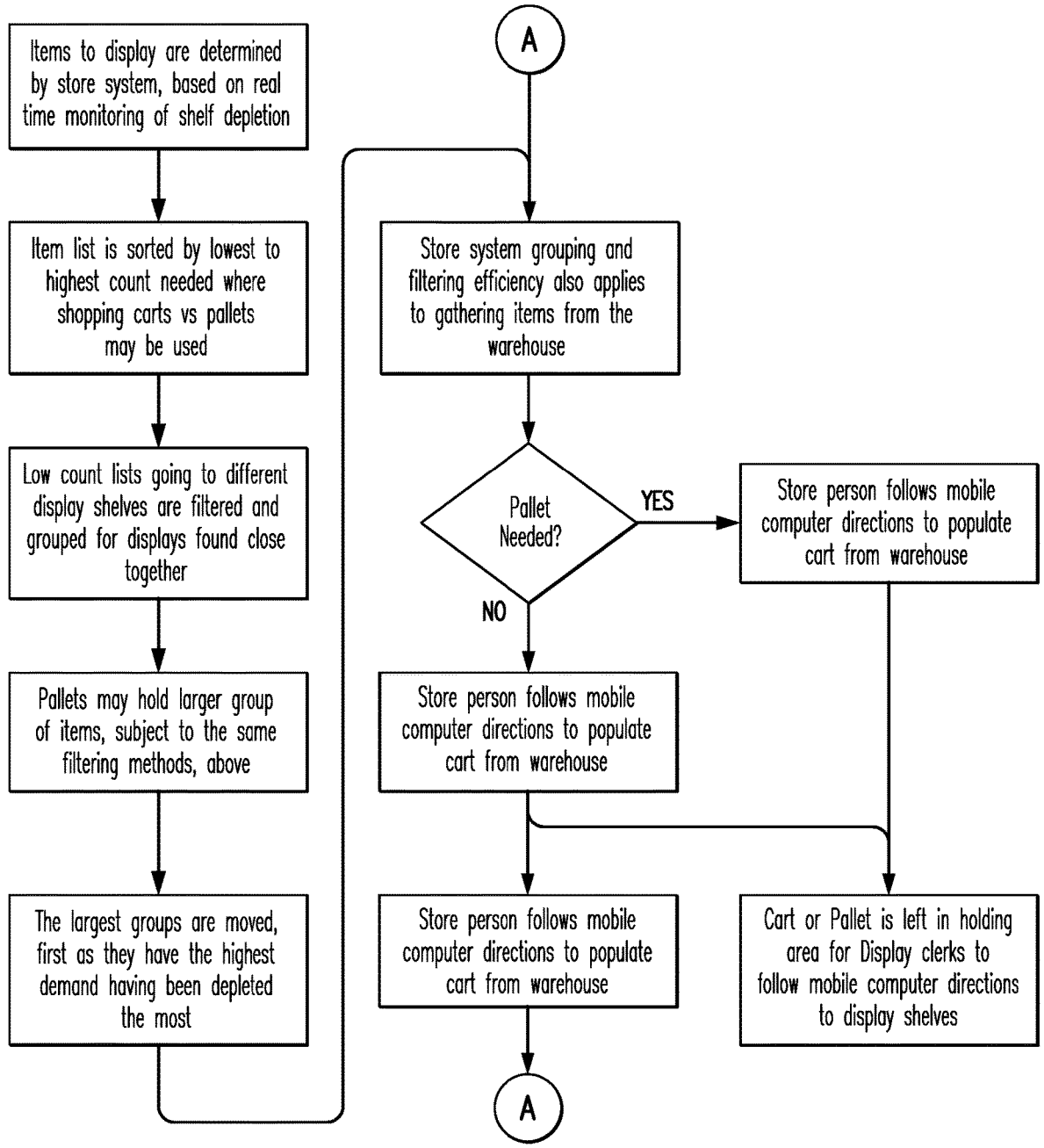
FIG. 12 illustrates a diagram indicating the logic of moving back-of-store inventory to shelves.
Figure 14A:
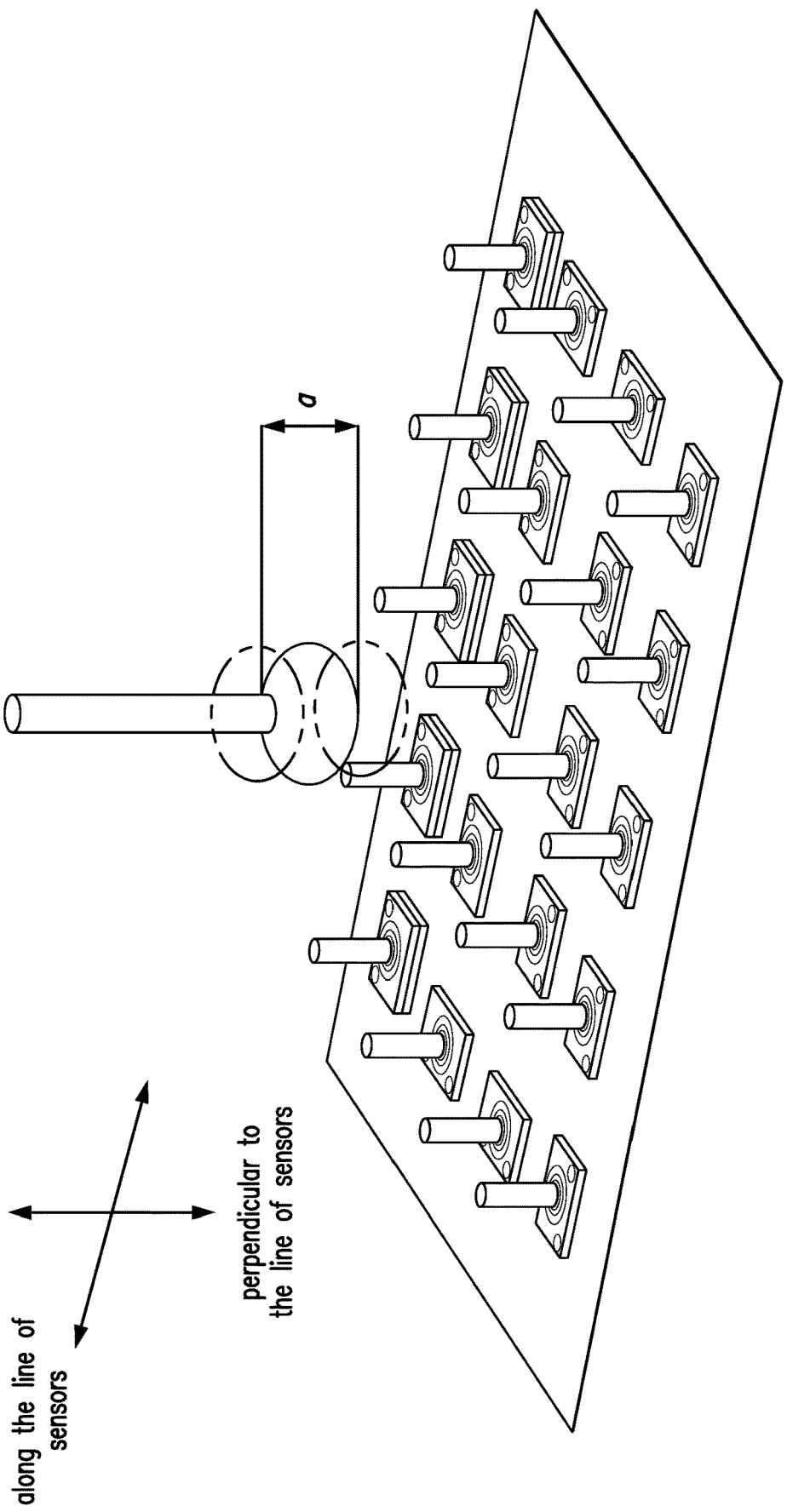
FIG. 14 and FIG. 15 illustrate exemplary embodiments of the detection of an object using the sensors of the invention.
Figure 14B:
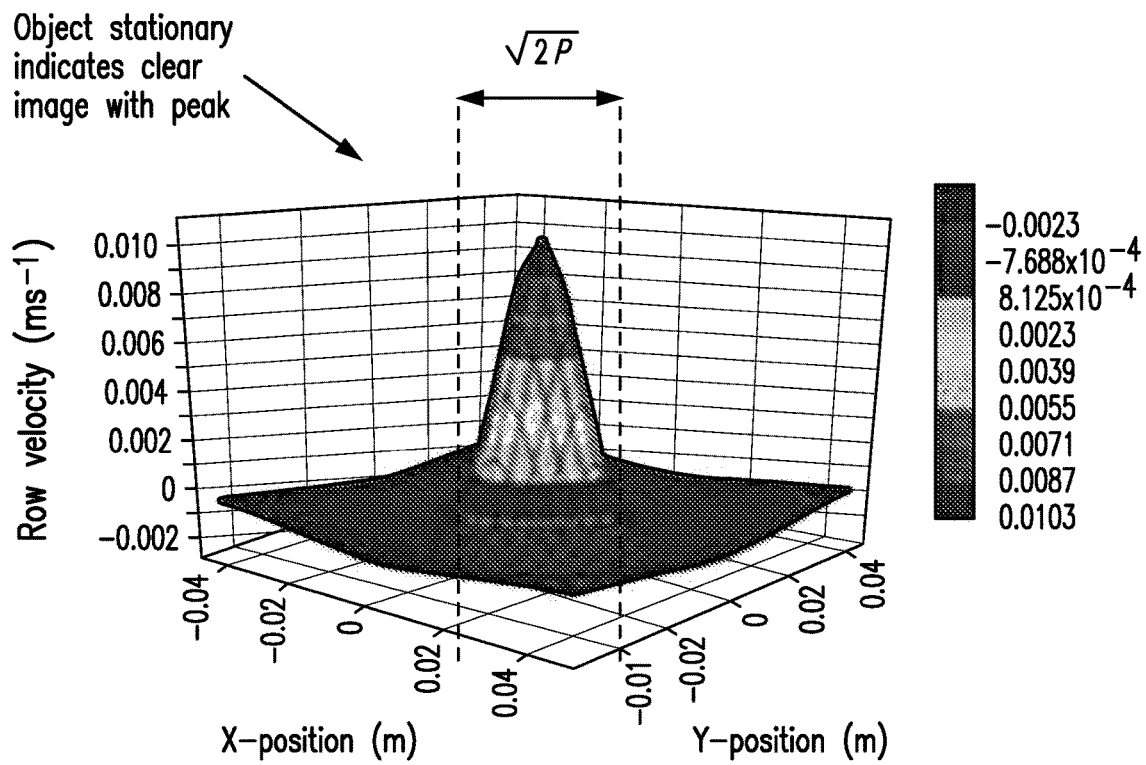
Figure 14C:
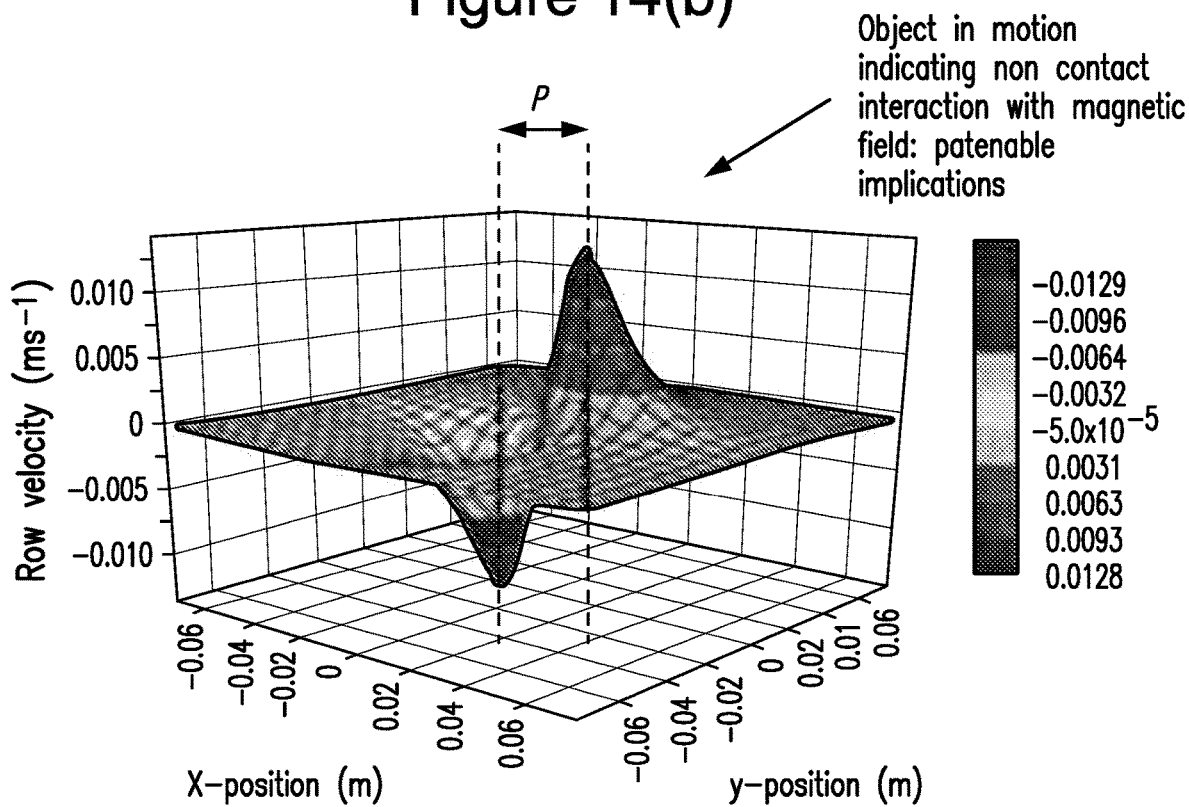
Figure 15A:
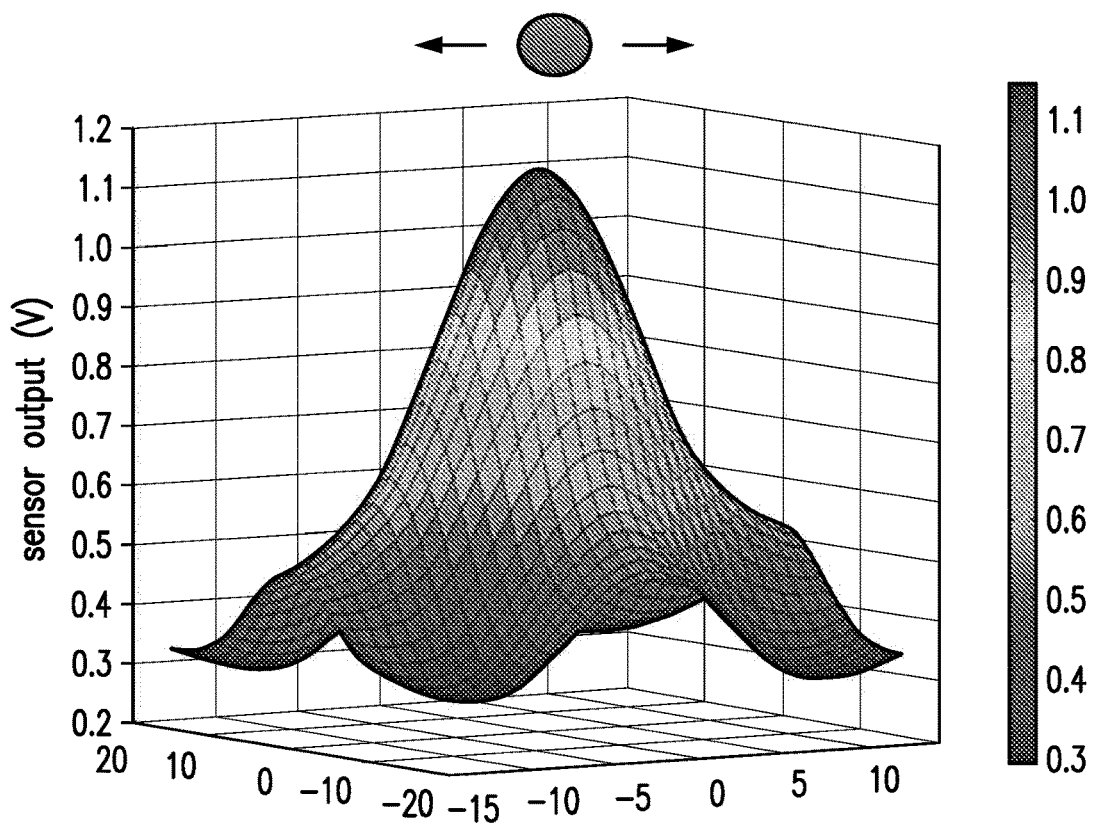
Figure 15B:
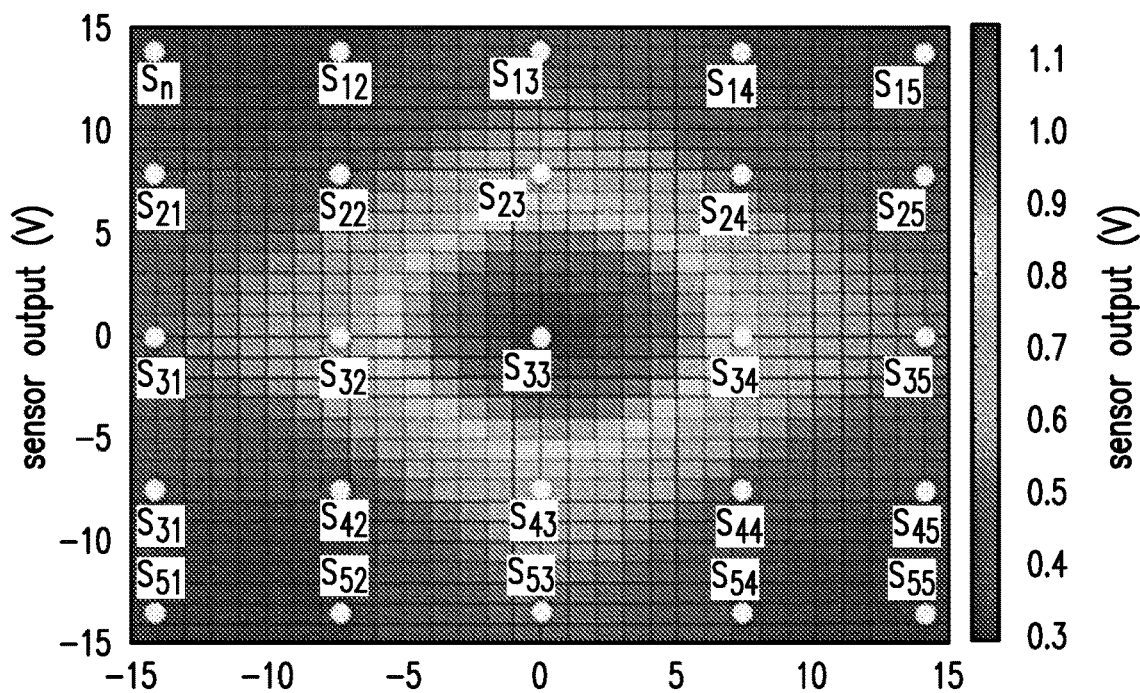

In embodiments, the invention is suitable for integration and use in refrigerators, freezers, cupboards, pantries, in and on the food preparation areas, storage cabinets, consumer shelves, shopping carts and baskets, retail foodstuff storage units, such as meat cases in a delicatessen, and placemats used under serving plates used to serve or eat food from, and the like.

Suitably, the weighing mechanism, which includes electronics, such as, but not limited to strain gauges, Hall effect sensors, piezometers and the like, are printed in electronic form and are integrated into a form of a paper-thin like, transparent structure. This thin structure, i.e. a sheet of electronics, the same size as a shelf in a refrigerator, freezers, cupboards, pantries, in and on the food preparation areas, storage cabinets, consumer shelves, shopping carts and baskets, retail foodstuff storage units, such as meat cases in a delicatessen, and placemats used under serving plates used to serve or eat food from, and the like, is either placed in the case or on the shelf in question in this form, or incorporates an adhesive backed format to more securely hold the paper structure in place.

The thin structure that holds the printed electronics is made of many types of conventional and low-cost sheet materials. The selection of the sheet material is primarily driven by the field of use, for example, a polyethylene material may be used in a refrigerator, shopping cart or damp area where foodstuffs and the like can spill and hence this sheet shelf structure needs to be conveniently wiped and/or washed down. In the case of the food consumption placemat or shopping cart liner, the intended technology is embedded in the placemat or liner in a robust but cost-effective manner, and is powered via small, coin sized battery which may or may not be recharged via wireless inductive power or kinetic, solar or ambient light power. This allows for routine operations of the MEMS/NEMS sensors and wireless communication to the external application.

In exemplary embodiments, the form factor of the thin printed structure, suitable for shelving applications can be printed in any width and length direction since the fundamental manufacturing process is a traditional sheet fed process. The thickness of the sheet material is typically between $\frac{1}{32}$" and $\frac{1}{16}$" of an inch.

With the printed electronics sheet material setting on a shelf, for example, in a refrigerator, used to store foodstuffs, when a foodstuff is placed on the printed electronics sheet material, the weighing mechanism determines identity of the foodstuff by allowing the electronics and the associated software application to capture the weight matrix profile of the foodstuff which includes its weight and footprint on the printed electronics sheet material, whether the item is placed directly on the sheet, or on top of another item on the sheet, thereby altering the original weight footprint of that item. These weight profiles combined with their sheet locations and relative or direct positions will be captured in an associated database and will be used, in part, to identify what the foodstuff is.

After the consumer uses and or otherwise, removes some of the foodstuff from the removed product from, in this example, the refrigerator, when the user places the foodstuff back into the refrigerator, the weighing mechanism will automatically, on indication of a new item placed on the shelf sheet material, measure the foodstuff and create a similar two-dimensional weight profile; compare its footprint and relative weight with the recently removed foodstuff of greater or equal weight and similar footprint and determine if it is a replacement of said item. If the (lesser/equal) weight and footprint of the foodstuff have been determined to have belonged to a foodstuff previously removed, and if the end user consumed some of the foodstuff, the foodstuff will weigh less, in this case. The associated application will be able to interrogate the weighing mechanism two-dimensional weight profile, assess the change in magnitude of peak values [the tare weight], and calculate, precisely the amount of foodstuff consumption, by percentage, based on the original ingredients of the foodstuff published on its retail package and then captured in the associated database, at its introduction to the refrigerator inventory.

The end user is not required to place the foodstuff back in the same location that it was removed from. The printed electronics in the shelf sheet material has the capability of determining where it is located inside the storage unit, what weight profiles have been previously identified at the various locations and changes in those weight profiles, even if the foodstuff is now placed on top of other items on the shelf sheet material.

The weight mechanism is capable of precise measurement, with resolution down to microgram weight consumption.

The associated applications, via industry standard API, will use this change in foodstuff consumption, to automatically update the end user's nutritional counting application.

In additional embodiments, the printed electronics on the thin sheet material will incorporate inductance technology.

Also, provided for methods of identifying what consumables, are being placed in storage items. This low-cost printed electronics include but are not limited to, scanning barcode readers, capable of reading standard UPC bar codes on consumable packaging, RFID readers, capable of reading RFID tags on consumables, an inward facing scanning camera, requiring zero ambient light, capable of capturing patterns and images of movement and location of what is on the shelves, and follow on transmittal to a pattern recognition application that will identify the items on the shelf, and a voice circuit, capable of capturing and processing the end users talking to the storage unit as they add or remove consumables from the storage unit.

In additional embodiments, a printed sensor capable of olfactorily identifying the food [by smell] is incorporated. As a foodstuff and the like is added to a storage unit, the spectrum of the associated smell of the item is captured, transmitted wirelessly via API to external applications that then compare the captured smell data to an industry database of foodstuff related smell profiles.

In additional embodiments, the invention of incorporating the concept of an electronic nose, cost effectively in consumer applications, will alert the end user to pending spoilage of foodstuffs and the like.

In additional embodiments, the invention leverages the emerging use of voice activated technology from the likes of Amazon, Google and others. These devices, increasingly found in residences and business, can respond to end users' commands and have the capability to control and direct output commands to other external applications.

The invention includes an external application interface to these types of voice command products that allows the end user as he/she is adding/removing consumables from the storage unit, to identify what the item is. This is of particular importance in situations where a foodstuff and the like, is stored in an opaque container, for example a Tupperware container. In this case, some of the other item identification techniques, described earlier, will not be able to detect what is in the opaque container. Through simple voice interaction and speech recognition, the product is identified and classified in the associated database, while the normal routine of the end user is not unduly impacted. This technique can also be applied to items that are traditionally wrapped in opaque storage material, i.e. tin foil and the like and are placed in a freezer section of a storage unit.

In additional embodiments, the present invention relates generally to circuit elements and more particularly in one aspect to inductors or inductive devices having various desirable electrical and/or mechanical properties, and methods of utilizing and manufacturing the same. This invention includes printable inductive wireless power, to meet low-cost consumer market requirements.

In additional embodiments, a myriad of different configurations of inductors and inductive devices are known in the prior art. One common approach to the manufacture of efficient inductors and inductive devices is the use of a magnetically permeable toroidal core. Toroidal cores are very efficient at maintaining the magnetic flux of an inductive device constrained within the core itself. Typically, these cores (toroidal or not) are wound with one or more magnet wire windings thereby forming an inductor or an inductive device. Prior art inductors and inductive devices are exemplified in a wide variety of shapes and manufacturing configurations.

In additional embodiments, for example, U.S. Pat. No. 3,614,554 to Shield, et al. issued Oct. 19, 1971 and entitled "Miniaturized Thin Film Inductors for use in Integrated Circuits" discloses thin film inductors for use with miniaturized integrated circuits that are fabricated by forming a first level of parallel metal strips on a substrate and then forming an insulating layer over the strips. A bar of magnetic material is disposed along the center portions of the metal strips and a layer of insulation is deposited over the bar of magnetic material. A second level of parallel metal strips is then formed over the layer of insulation and is connected between opposed ends of adjacent ones of metal strips at the first level to form a continuous flattened coil around the bar of magnetic material. In other embodiments of the invention, the bar of magnetic material may be omitted, or may be disposed outside the continuous flattened coil formed by the metal strips.

In additional embodiments, U.S. Pat. No. 4,253,231 to Nouet issued Mar. 3, 1981 and entitled "Method of making an inductive circuit incorporated in a planar circuit support member" discloses a planar support member for an electric circuit, e.g. a printed circuit board, wherein at least a region of the support member includes magnetic material through at least a part of its thickness. A magnetic circuit is made in this material by forming at least one opening through it. The support member is then coated with insulative material and conductor paths are made on both faces of the support member by conventional techniques for such members. These paths include a winding disposed around a core part of the magnetic circuit with alternate half turns being formed on opposite faces and interconnected by through plating. The inductive circuit thus formed may constitute an inductor, a transformer or a relay In additional embodiments, U.S. Pat. No. 4,547,961 to Bokil, et al. issued Oct. 22, 1985 and entitled "Method of manufacture of miniaturized transformer" discloses a miniaturized thick-film isolation transformer comprising two rectangular substrates each carrying successive screen-printed thick-film layers of dielectric with spiral planar windings embedded therein. The spiral windings comprise conductors formed of fused conductive particles embedded within a layer of dielectric insulating means solidified by firing at high temperature to form a rigid structure with the windings hermetically sealed within the dielectric and conductively isolated from each other within the transformer. The substrates are formed at opposite ends thereof with closely adjacent connection pads all located at a single level to accommodate automated connection making. Connections between the pads and the windings are effected by conductors formed of fused conductive particles. The substrates and the dielectric layers are formed with a central opening in which is positioned the central leg of a three-legged solid magnetic core. The remaining portions of the core surround the two substrates to form a compact rugged construction especially suitable for assembly with hybrid integrated circuit components.

In additional embodiments, U.S. Pat. No. 4,847,986 to Meinel issued Jul. 18, 1989 and entitled "Method of making square toroid transformer for hybrid integrated circuit" discloses a square toroid transformer that is assembled on a ceramic hybrid integrated circuit substrate. The primary and secondary windings of the transformer are provided on opposite arms of a square toroid ferrite core by providing first and second groups of spaced, parallel metal conductors on the surface of the ceramic substrate and adherent thereto, and an insulative layer over the first and second groups of conductors, leaving their respective end portions exposed. The square toroid ferrite core, coated with dielectric material, is attached to the insulative layer. Wire bonds in planes perpendicular to the longitudinal axes of the opposite arms each are wire bonded, respectively, to an inner end of one of the metal conductors and an outer end of an adjacent one. A large number of turns for both the primary winding and the secondary winding are achieved, resulting in high primary and secondary winding and inductances, while maintaining a uniform separation and high breakdown voltage between the primary and secondary wirings.

In additional embodiments, U.S. Pat. No. 5,055,816 to Altman, et al. issued Oct. 8, 1991 and entitled "Method for fabricating an electronic device" discloses a method of fabricating an electronic device on a carrier wherein the method comprises forming a hole pattern in the carrier, and providing a metallization pattern on the carrier, and through the holes to define the electronic device.

In additional embodiments, U.S. Pat. No. 5,126,714 to Johnson issued Jun. 30, 1992 and entitled "Integrated circuit transformer" discloses an integrated circuit transformer which is constructed in a laminar factor. The disclosed invention includes a bottom plate with cores protruding from its upper surface and a top plate with several feed through holes. Both plates are made from high permeability magnetic material. Interposed between the top and bottom plates are at least one primary and at least one secondary. The primary has feed through holes, vertically aligned with the feed through holes in the top, holes to allow the cores to protrude through, and tabs for connecting to the input circuit. The primary is made of a laminate clad with an electrical conductor. The circuit which conducts the current around the cores is fabricated by etching special patterns of insulative gaps into the electrical conductor. The secondary has holes to allow the cores to protrude through. It also is made of a laminate clad with an electrical conductor. And again, the circuit which conducts the current around the cores is fabricated by etching a special pattern of insulative gaps into the electrical conductor. The output circuit is connected to the secondary at three connection points. These points are accessible through the feed through holes and access holes. The primary and secondary may be fabricated as a sub-assembly by multiple layer printed circuit techniques. More than one primary and secondary may be utilized in the integrated transformer. The transformer may be embodied as a current, a voltage or a power transformer.

In additional embodiments, U.S. Pat. No. 5,257,000 to Billings, et al. issued Oct. 26, 1993 and entitled "Circuit elements dependent on core inductance and fabrication thereof" discloses magnetic circuit elements, e.g. for inclusion on circuit boards including one or more windings about a toroidal core that are produced by joinder of mating sheets, one or both recessed to hold the core, and each containing partial windings. Joinder is by use of an anisotropically conducting adhesive layer. The layer is applied as an uncured thermosetting adhesive containing spherical conducting particles of such size and distribution as to statistically result in electrical completion of windings while avoiding turn-to-turn shorting.

In additional embodiments, U.S. Pat. No. 5,487,214 to Walters issued Jan. 30, 1996 and entitled "Method of making a monolithic magnetic device with printed circuit interconnections" discloses a monolithic magnetic device having a plurality of transformer elements having single turn primaries and single turn secondaries fabricated on a plate of ferrite which has the outline of a ceramic leadless chip carrier. Each of the magnetic elements has a primary winding formed from a copper via plated on the ferrite. Each element's secondary is another copper via plated over an insulating layer formed over the first layer of copper. The elements' primaries are interconnected on the first copper layer and the elements' secondaries are interconnected on the second copper layer. The configuration and turns ratio of the transformer are determined by the series and or parallel interconnections of the primary and secondaries. Some of the interconnections can be provided by the next higher assembly level through the circuit card, with the same magnetic device providing many turns ratio combinations or values of inductors.

In additional embodiments, U.S. Pat. No. 5,781,091 to Krone, et al. issued Jul. 14, 1998 and entitled "Electronic inductive device and method for manufacturing" discloses inductive electrical components fabricated by PWB techniques of ferromagnetic core or cores that are embedded in an insulating board provided with conductive layers. Conductive through-holes are provided in the board on opposite sides of a core. The conductive layers are patterned to form with the conductive through-holes one or more sets of conductive turns forming a winding or windings encircling the core. The conductive layers can also be patterned to form contact pads on the board and conductive traces connecting the pads to the windings.

In additional embodiments, U.S. Pat. No. 6,440,750 to Feygenson, et al. issued Aug. 27, 2002 and entitled "Method of making integrated circuit having a micromagnetic device" discloses a method of manufacturing an integrated circuit and an integrated circuit employing the same. In one embodiment, the method of manufacturing the integrated circuit includes (1) conformally mapping a micromagnetic device, including a ferromagnetic core, to determine appropriate dimensions therefore, (2) depositing an adhesive over an insulator coupled to a substrate of the integrated circuit and (3) forming the ferromagnetic core of the appropriate dimensions over the adhesive.

In additional embodiments, U.S. Pat. No. 6,445,271 to Johnson issued Sep. 3, 2002 and entitled "Three-dimensional micro-coils in planar substrates" discloses a three-dimensional micro-coil situated in a planar substrate. Two wafers have metal strips formed in them, and the wafers are bonded together. The metal strips are connected in such a fashion to form a coil and are encompassed within the wafers. Metal sheets are formed on the facing surfaces of the wafers to result in a capacitor. The coil may be a single or multi-turn configuration. It also may have a toroidal design with a core volume created by etching a trench in one of the wafers before the metal strips for the coil are formed on the wafer. The capacitor can be interconnected with the coil to form a resonant circuit. An external circuit for impedance measurement, among other things, and a processor may be connected to the micro-coil chip.

In additional embodiments, United States Patent Publication No. 20060176139 to Pleskach; et al. published Aug. 10, 2006 and entitled "Embedded toroidal inductor" discloses a toroidal inductor, including a substrate, a toroidal core region defined within the substrate, and a toroidal coil including a first plurality of turns formed about the toroidal core region and a second plurality of turns formed about the toroidal core region. The second plurality of turns can define a cross sectional area greater than a cross sectional area defined by the first plurality of turns. The substrate and the toroidal coil can be formed in a co-firing process to form an integral substrate structure with the toroidal coil at least partially embedded therein. The first and second plurality of turns can be disposed in alternating succession. The toroidal core region can be formed of a substrate material having a permeability greater than at least one other portion of the substrate.

In additional embodiments, United States Patent Publication No. 20060290457 to Lee; et al. published Dec. 28, 2006 and entitled "Inductor embedded in substrate, manufacturing method thereof, micro device package, and manufacturing method of cap for micro device package" discloses an inductor embedded in a substrate, including a substrate, a coil electrode formed by filling a metal in a spiral hole formed on the substrate, an insulation layer formed on the substrate, and an external connection pad formed on the insulation layer to be connected to the coil electrode. The inductor-embedded substrate can be used as a cap for a micro device package by forming a cavity on its bottom surface.

In additional embodiments, United States Patent Publication No. 20070001796 to Waffenschmidt; et al. published Jan. 4, 2007 and entitled "Printed circuit board with integrated inductor" discloses a printed circuit board with an integrated inductor. A core of an inductor may be realized by ferrite plates glued onto a substrate. A winding of the inductor is provided in the substrate In additional embodiments, United States Patent Publication No. 20070216510 to Jeong; et al. published Sep. 20, 2007 and entitled "Inductor and method of forming the same" discloses an inductor pattern that is formed on a substrate. A conductive pattern having a concave-convex structure is formed on the inductor pattern to increase a surface area of the inductor pattern. An insulation layer is formed on the inductor pattern. After a groove is formed such that the insulation layer is removed to expose the inductor pattern, a conductive pattern is conformally formed on the groove and the insulation layer. Thus, a surface area of the inductor pattern as well as a thickness of an inductor increases to obtain an inductor of a high-quality factor.

In additional embodiments, despite the broad variety of prior art inductor configurations, there is a salient need for low-cost, printed, inductive devices that are both: (1) low in cost to manufacture; and (2) offer improved electrical performance over prior art devices. Ideally, such a solution will not only offer improved electrical performance for the inductor or inductive device; but, will also provide greater consistency between devices manufactured in mass production. Such a solution should also increase consistency and reliability of performance by limiting opportunities for manufacturing errors of the device.

In further embodiment, the invention encompasses low-cost wireless communication to external applications, typically accessible through the internet.

In additional embodiments, the invention encompasses a software layer prior to the API that will perform the necessary cost effective calculation of sensor data handling, calibration if necessary, trouble shooting, error reporting, and report generation for the respective storage unit systems, for which it is installed.

In additional embodiments, the invention encompasses the necessary interfaces to allow existing and future nutritional counting applications to flourish. It is anticipated that these third-party applications will also leverage the voice actuated systems, as described above, in a manner that alerts, advises or otherwise communicates with the end user in real-time as to the interactions with the foodstuffs and the like.

In further embodiments, typically multiple foodstuffs are removed from a storage unit to prepare a meal for multiple persons. In this case, it would be problematic to ascertain how much of the prepared food is allocated to multiple end users of the nutritional counting application. To this end, the invention described above is also embodied into a portable "placemat" form factor capable of performing the identical service for each end user.

In a further embodiment, in the case of the food preparation application, the "placemat", which can be in the form of a storable, typically store bought placemat with embedded electronics, as described herein; or, could be embedded electronics in the food preparation area of the countertop, is located under the containers from which foodstuffs are taken, as well as the preparation area on which food preparation is taking place. As the food preparer begins to add ingredients, the food preparer speaks to the associated voice application, advising as to which ingredient has been added to the food preparation container. This information along with the weight measurement, made with the embedded sensors in the "placemat", is used to identify which containers contain the respective ingredients; build the recipe as it is being prepared and accurately account for the caloric contents of the meal item being produced. This information is wirelessly communicated through the API to the third-party calorie counting applications. The end user uses the voice interface to advise the application as to the number of food portions that are being assembled. The "placemat" is powered with a small coin size battery or if in the case of the embedded electronics in the countertop, is inductively powered.

In a further embodiment, a camera directed at the food preparation area, is used in conjunction with pattern recognition software to identify the ingredients being added to the food preparation containers. This information is, as before, used with the differential weight measurements arising from the embedded electronics in the "placemat", to record and document the contents and distribution, caloric and nutritional, of the foodstuffs being prepared.

In a further embodiment, a placemat is placed under each person's plate at the table, as well as the serving containers and plates from which foodstuffs are served. The placemats incorporate the embedded electronics, wireless communication and small coin battery power supply, as before. The applications weigh the individual's consumption, as well as the remaining "leftover" foodstuffs on the serving plates and containers, based on differential weight measurement of the tare weight of the plate, the gross weight with the food on the plate, and the final weight of the plate. The voice application is used to identify the person sitting at each placemat at the table.

In a further embodiment, a camera directed at the food consumption area, is used in conjunction with pattern recognition software to identify the person consuming the food, and, ingredients being consumed. This information is, as before, used with the differential weight measurements arising from the embedded electronics in the "placemat".

In additional embodiments, the invention encompasses the necessary interfaces to track, in real-time, the available inventory sitting on all shelves of a store or warehouse, by RFID, barcode, weight and weight footprint of said inventory items.

In a further embodiment, in a grocery store, for example, a thin sheet of polyethylene material containing the intended technology, holds the printed electronics embedded in the material, used to line the display shelves to identify and quantify the items placed thereon by barcode and/or weight and weight footprint. The material used would allow for spills and damp cleanup to occur as needed.

In a further embodiment, to eliminate price printing and paper labels, a fully customizable, digital shelf-edge label may be dynamically connected to any segment of electronic display shelf material, wirelessly communicating with the intended technology embedded in the polyethylene material to instantly "associate" with the consumables sitting on the shelf segment, said shelf-edge label is connected to.

In a further embodiment, the unique digital identifier of the shelf-edge label, typically a MAC address (Media Access Control), would allow it to wirelessly communicate with the store's product database system, to download and display the product details associated with the RFID, barcode and/or weight and weight footprint of the items sitting on the attached segment of the electronic display shelf material.

In a further embodiment, the digital shelf-edge label and associated electronic display shelf material may be powered via small, coin sized battery which may or may not be recharged via wireless inductive power or kinetic, solar or ambient light power. This allows for routine operations of the MEMS/NEMS sensors and wireless communication between the shelf-edge label and associated electronic display, as well as wireless communication with the store's product database system.

In a further embodiment, the shelf-edge label would network with the centrally controlled product database, deriving information such as, but not limited to, product details, sale price, expiry and quantity limit and "call out" (i.e. coding to signify a different color display than standard shelf-edge labels, to draw attention to the items on that shelf), and the like. This wireless communication has the effect of automatically associating any digital shelf-edge display with the related products on the shelf above, by having a known product—or grouping of the same product (such as the same cans of soup)—on the segment of the shelf material attached to said shelf-edge label.

In a further embodiment, in the above example, a plastic base "liner" containing printed electronic sensors, may be inserted into shopping carts, baskets and the like, on which to place consumables, allowing for the identification and tracking by RFID, barcode, weight and weight footprint of all items transferred to and from a display shelf and said shopping cart, basket and the like.

In a further embodiment, a mobile device serving as combination wireless magnetic stripe and chip card reader, RFID and barcode reader and touch screen smart display or a mobile "smart" phone serving one or more of those functions, would be attached to shopping carts, to enhance the shopping experience by displaying their up-to-date shopping tally; communicating with their smart phone managed shopping list and/or keeping tabs on their store-managed shopping history from prior visits to any store in the chain; communicating current store specials, cross-merchandised items (based on their current purchases and vicinity to said items) and directing the shopper to item locations by giving "arrow" indications on the screen, relative to their current geo-location in the store.

In a further embodiment, with the ability to cross-reference a shopper's shopping list with the central store product database, linked to all known consumables' geo-location in the store, their shopping list could be re-ordered or split between two or more shopping carts, to give them the most efficient route to traverse the store, to finish their shop, quickly.

In a further embodiment, the aforementioned shopping cart smart display or mobile phone would associate with the electronics in the shopping cart liner to have a real-time accounting of all items placed in the shopping cart. Just as the digital shelf-edge label associates with its respective shelf items, the smart display/phone associates with its respective shopping cart contents, having both the shelf label and the smart display, or mobile phone, equipped with unique MAC identifiers and wireless communication capability ranging from NFC (Near Field Communication), Bluetooth, Wi-Fi, and the like, they will be "proximity-aware" of how near they are to each other, permitting the smart display/phone and shelf label software to utilize the proximity meta-data associated with the transfer of any item, thereby permitting the smart display/phone and shelf label to track the transfer of any item from shelf to nearby cart and vice versa. This proximity meta data may also be tracked centrally on a cart tracking system capable of geo-locating any cart and shelf-edge label in the store, in real-time, then identifying carts closest to respective shelf labels.

In a further embodiment, knowing any cart's proximity to nearby shelves, the transfer of items from those shelves to said carts—with the known combined weight of one or more shelf items and the transfer of said weight to or from one or more nearby carts—permits the computation of combined tare weight distribution among the nearby carts and shelves, representing the transfer of known, identifiable, consumables from one or more shelves to one or more nearby carts. Thus, eliminating any change in normal shopping habits, while permitting an automated tally of item charges for those items associated by proximity and weight distribution of nearby consumables transferred from display shelves to shopping carts and baskets, and vice versa.

In a further embodiment, the cart tally—with items placed on top of other items and/or inside shopping bags in the cart—by weight footprint distribution of said items would be "mapped" within the associated smart display/phone of said cart by having software track the historical addition and removal of items in the cart; knowing their individual weights and footprints, based on the shelves they were taken from, and tracking their adjustment in the cart, based on the initial location they were placed in and the associated weight distribution map of the cart, at that time. This cart weight mapping allows for the removal of particular weight, thus adjusting the footprint distribution, to be identifiable as a prior added weight from a particular shelf and knowing the historical identity of said removed item or items, by their combined weight, and the proximity to their originating shelf, the smart screen can be programmed to prompt the shopper to "please return [item name] back to its original location" and/or give further detailed information about the item they are now holding in their hand, for instance, its nutritional content or some recipe suggestions, based on other items in their cart and/or past shopping history.

In a further embodiment, in the event a shopper does not return an item to its proper location after removing it from their cart, the central product database can be made aware of its new location, either by geo-location of the shopping cart at the time of the item's removal and/or by the addition of the item weight onto the printed electronics of a shelf displaying different items, and immediately direct an store clerk to find and inspect it and move it to where it belongs or discard it as damaged, defective or past its due date.

The thin structure that holds the printed electronics is made of many types of conventional and low-cost sheet materials. The selection of the sheet material is primarily driven by the field of use, for example, a polyethylene material may be used in a refrigerator, shopping cart or damp area where foodstuffs and the like can spill and hence this sheet shelf structure needs to be conveniently wiped and/or washed down. In the case of the food consumption placemat or shopping cart liner, the intended technology is embedded in the placemat or liner in a robust but cost-effective manner, and is powered via small, coin sized battery which may or may not be recharged via wireless inductive power or kinetic, solar or ambient light power. This allows for routine operations of the MEMS/NEMS sensors and wireless communication to the external application.

In a further embodiment, the stocking and re-stocking of store shelves may be accomplished with a detachable smart display or mobile smart phone, with similar features as the shopping cart smart display/phone, that may be used as a hand-held unit and/or attached to a manual or electric pallet truck, and the like, for the purpose of transporting consumables from back-of-store inventory to display shelves. Said detachable smart display/phone will be equipped with RFID and/or barcode reader, to allow for the identification of a single item, prior to placing a group of said items on the thin sheet of polyethylene material containing the intended electronic technology to track the addition of said consumables to the shelf display.

In a further embodiment, in the above example, a plastic base "cover" containing printed electronic sensors, may be inserted onto the forks of the manual or electric pallet trucks, and the like, on which to place back-of-store inventory, allowing for the identification and tracking by RFID, barcode, weight and weight footprint of all items transferred to display shelves, from back-of-store inventory, using the detachable smart display/phone, described above.

In a further embodiment, shelving used for all back-of-store inventory storage, as well as designated pallet placement areas may be fitted with durable plastic liners containing printed electronic sensors, on which to place all inventory received, to allow for the tracking of all inventory shipped to the store from the time it is received, for in-store distribution.

In a further embodiment, back-of-store inventory described above and sitting on plastic liners containing printed electronic sensors can be tracked using digital inventory shelf-edge displays, in similar fashion as the digital display shelf-edge displays, described above. Thus, respective inventory shelving and storage may be dynamically described and re-purposed, depending on the RFID's and barcodes identifying the just placed inventory.

What is claimed is:

1. A system to track a location of an item throughout a store by creating a virtual fingerprint for automated tracking of consumable items comprising:
   printed electronics integrated into a thin-sheet structure;
   (ii) MEMS/NEMS sensor modalities comprising one or more strain gauges, Hall sensors, and piezometers that are integrated into the thin-sheet structure;
   (iii) wireless power and communication; and
   (iv) software interfaces to domain-specific applications with technology platforms to automatically identify, measure and report on location and/or transfer of inventory items,
   wherein the printed electronics sheet material further comprises generation of a weight matrix that determines identity of the consumable items by allowing the electronics and the associated software application to capture a weight matrix profile of the consumable items, which includes its weight, virtual footprint and location on the printed electronics sheet material to allow tracking the consumable items throughout the location of a store.

2. The system of claim 1, wherein the system is a refrigeration system.

3. The system of claim 1, wherein the printed electronics comprise on or more inductors or inductive devices comprising various electrical and/or mechanical properties.

4. The system of claim 3, wherein the printed electronics comprise printable inductive wireless power.

5. The system of claim 3, wherein the inductors and inductive devices comprise a magnetically permeable toroidal core.

6. The system of claim 1, wherein the printed electronics can identify item type, location, and weight.

7. The system of claim 6, wherein the identification of weight has a resolution down to microgram weight.

8. The system of claim 1, wherein the printed electronics on the thin sheet material will incorporate inductance technology.

9. The system of claim 1, wherein the system includes sensors to identify spoilage of food.

10. The system of claim 1, wherein the system comprises wireless communication to external applications.

11. The system of claim 1, wherein the system is in the form of a placemat.

12. The system of claim 11, wherein the placemat comprises embedded sensors to identify item, ingredients, caloric content, and/or brand.

13. The system of claim 11, wherein the placemat is inductively powered.

14. The system of claim 1, further comprising a camera.

* * * * *